United States Patent [19]

Kafka

[11] Patent Number: 4,913,520

[45] Date of Patent: Apr. 3, 1990

[54] OPTICAL FIBER FOR PULSE COMPRESSION

[75] Inventor: James D. Kafka, Mountain View, Calif.

[73] Assignee: Spectra Physics, San Jose, Calif.

[21] Appl. No.: 262,440

[22] Filed: Oct. 25, 1988

[51] Int. Cl.$^4$ ............................................. G02B 27/44
[52] U.S. Cl. ........................... 350/96.30; 350/162.17; 350/96.34
[58] Field of Search ................. 350/96.1, 96.15, 96.29, 350/96.30, 162.11, 162.17, 320, 168

[56] References Cited

U.S. PATENT DOCUMENTS 4,750,809  6/1988  Kafka et al. ................... 350/162.17

OTHER PUBLICATIONS

E. B. Treacy, "Compression of Picosecond Light Pulses", Phys. Lett. 28A, 34 1968.
M. A. Duguay and J. W. Hansen, "Compression of Pulses from Mode-Locked HeNe Laser", Appl. Phys. Lett. 14, 14 (1969).
B. Nicolaus and D. Grischkowsky, "12x Pulse Compression Using Optical Fibers", Appl. Phys. Lett. 43, 1 (1983).
B. Nicolaus and D. Grischkowsky, "90-fs Tunable Optical Pulses Obtained by Two-Stage Pulse Compression", Appl. Phys. Lett. 43, 228 (1983).
A. M. Johnson and W. M. Simpson, "Optically Biased Tunable Femtosecond Dye Laser and Spectral Windowing of the Compressed Second Harmonic of Nd:YAG", IEEE Jor. Quantum Electron, QE 22, 133 (1986).

Primary Examiner—Frank Gonzalez
Attorney, Agent, or Firm—Lyon & Lyon

[57] ABSTRACT

An optical fiber for use in a pulse compressor which compresses a relatively long width optical pulse to a short width pulse, has a V number between 2 and 2.405 and a Δ of less than 0.3%. In another aspect of the present invention the optimum length of an optical fiber which may be used to generate self phase modulation in a pulse compression apparatus is selected by successively cutting off fixed lengths of the fiber and measuring the optical energy of a pulse from which the Raman band has been separated. When the optical energy no longer increases, the fiber length has been optimized.

4 Claims, 1 Drawing Sheet

OPTICAL FIBER FOR PULSE COMPRESSION

BACKGROUND OF THE INVENTION

This application is related to U.S. Pat. No. 4,750,809, assigned to the same assignee as the present invention and which is expressly incorporated herein by reference.

1. Field of the Invention

This invention relates to methods and apparatus for optical pulse compression. More particularly, the present invention relates to optical fibers for use in pulse compression.

The present invention has particular application for compressing long width laser output pulses having pulse widths in the order of 100 picoseconds and for achieving pulse compression ratios as high as 45 to 1 by means of a dispersive delay line which has a grating spacing at a convenient distance of 10–30 centimeters (so that the compressor unit is compact) and which operates at relatively high throughput efficiencies in the range of 35 to 40 percent.

2. The Prior Art

In 1986, Treacy [E. B. Treacy, "Compression of Picosecond Light Pulses," Phys. Lett. 28A, 34 (1968).] reported experiments where he compressed chirped optical pulses with a grating pair. Duguay and Hanson [M. A. Duguay and J. W. Hansen, "Compression of Pulses from Mode-locked HeNe Laser," Appl. Phys. Lett. 14, 14 (1969).] compressed 500 ps mode-locked pulses from a HeNe laser by a factor of 2 using a phase modulator and a Gires-Tournois interferometer. More recently, Nikolaus and Grischkowsky [B. Nicolaus and D. Grischkowsky, "12× Pulse Compression Using Optical Fibers," Appl. Phys. Lett. 43, 228 (1983) an B. Nikolaus and D. Grischkowsky, "90-fs Tunable Optical Pulses Obtained by Two-Stage Pulse Compression," Appl. Phys. Lett. 43, 1 (1983).] used the effect of self phase modulation in a single mode optical fiber to chirp an optical pulse, and then compressed the pulse using a grating pair. Johnson el al. [A. M. Johnson and W. M. Simpson, "Optically Biased Tunable Femtosecond Dye Laser and Spectral Windowing of the Compressed Second Harmonic of Nd:YAG," IEEE Jor. Quantum Electron. QE-22, 133 (1986) have used this technique to compress the 35 ps pulses from a frequency-doubled, mode-locked CW Nd:YAG laser.

All of these publications are incorporated by reference in this patent application in accordance with §608.01(p) of the Manual of Patent Examining Procedure of the United States Patent and Trademark Office.

In the prior art, as noted above, and in other prior art known to the inventors, single mode fibers which have been used for pulse compression at a wavelength of 1064 nanometers have had a core radius of 3.8 microns or less and have had a Δ of 0.3% or more.

BRIEF DESCRIPTION OF THE INVENTION

It is an important object of the present invention to compress a relatively long width optical pulse to a shorter width pulse in a way that produces both high efficiency and large compression effect in a convenient distance.

The present invention comprises optical fibers for use in pulse compression apparatus and methods for efficiently compressing a relatively long width optical pulse, of the kind which may be transform limited, to a shorter width pulse.

The present invention includes unique optical fibers for generating from the long pulse an output which has a bandwidth that is broadened as required for compression of the long pulse to the short pulse.

According to one aspect of the present invention, an optical fiber is provided having a core radius larger than 3.8 micrometers. The optical fiber of the present invention has a Δ lower than 0.3%.

According to another aspect of the invention, a method for selecting an optical fiber having an optimum length for pulse compression, the optimum length of an optical fiber for use in pulse compression, i.e., to produce a pulse having a broadened bandwidth, may be less than 30 meters and may be determined by the steps of generating in the optical fiber an optical pulse having a bandwidth broadened to include additional colors required for compression of the long pulse to the shorter pulse, measuring the intensity of an optical pulse conducted through the fiber from which the Raman band has been separated, cutting a fixed length from the optical fiber and again measuring the intensity of an optical pulse conducted through the fiber from which the Raman band has been separated. The cutting and measuring steps are repeated until the beam energy no longer increases.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF A PREFERRED EMBODIMENT

It has been discovered that the core radius of an optical fiber may be advantageously varied from the values typically employed in the prior art. With a larger core radius and the length of the optical fiber optimized by the method disclosed herein, greater self phase modulation is obtained.

Figure 1:
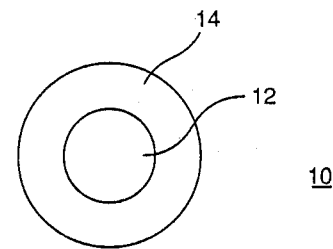
FIG. 1 is a diagram of a cross section of an optical fiber according to the present invention.

Referring first to FIG. 1, a cross section of an optical fiber according to the present invention, an optical fiber 10 includes a core portion 12 and a cladding portion 14. A core portion 12 of optical fiber 10 has an index of refraction of $n_1$. The cladding portion 14 of optical fiber 10 has an index of refraction $n_0$. According to one aspect of the invention, the radius of the core portion 12 of optical fiber 10 may be larger than that previously thought to be advantageous for use in optical fibers.

The core size may not be increased indefinitely because the fiber must remain single mode. In order to obtain a single mode fiber with a larger core radius, the index difference must be decreased from its typical value of 0.3%. Delta ($\Delta$) is defined by equation 1:

$$\Delta = \frac{n_1^2 - n_0^2}{2n_1^2} \quad [1]$$

where $n_1$ equals the index of refraction of the core of the optical fiber and where $n_0$ equals the index of refraction of the cladding of the optical fiber.

The operating mode of the optical fiber may be found by using the expression found in equation 2:

$$V = \frac{(n_1^2 - n_0^2)^{\frac{1}{2}} 2 \pi a_1}{\lambda} \quad [2]$$

where $a_1$ is the core radius, $\lambda$ is the wavelength, and V is a dimensionless number sometimes called the normalized frequency parameter, or V number. For single mode operation, V must be less than 2.405. A CW mode-locked Nd:YAG laser source with 80 PS pulses, low average power and 82 MHZ repetition rate has been used with conventional optical fibers having a $\Delta$ approximately equal to 0.3% and a core radius of 3.8 micrometers, a pulse of 4.0 picoseconds may be obtained. Using a fiber according to the present invention having a core radius of 4.6 microns, and a $\Delta$ of 0.217., a pulse of 3.0 picoseconds may be obtained.

A relationship has been discovered between two competing effects which take place in the optical fiber. The first effect, self-phase modulation, is required for pulse compression. The second effect, Raman generation, is undesirable since it transforms the pulse energy into other frequencies which are not useable. Both of these processes are intensity and length dependent.

It has been discovered that Raman generation, associated with the use of long lengths of single mode optical fibers such as the 300 meter length described in the U.S. Pat. No. 4,750,809 can be significantly reduced by employing shorter optical fiber lengths. Thus, while long fiber lengths are useful, shorter optical fiber lengths allow considerable greater output power with some sacrifice in compression ratio.

For example, it has been discovered that an optical fiber length of less than 30 meters is desirable for a 10 watt 100 picosecond pulse laser, because the shorter length allows increased output power before significant Raman generation. It has been found that the optimum length of an optical fiber suitable for obtaining higher output power should be from 10 to 30 meters. For an 80 picosecond pulse having 12 watts of average power, a length of approximately 17 meters has been found to be satisfactory. For an 80 picosecond pulse having an average power of 8 watts, 21 meters has been found to be satisfactory.

To determine these optimum lengths, a optical fiber having a length of 30 meters is initially provided. One meter lengths are cut from the optical fiber and intensity measurements made after each cut.

Using a grating to separate out the Raman band, as is known in the art, power in the self phase modulated beam is observed. The fiber length is reduced in increments, preferably but not limited to one meter increments, until the self phase modulated beam no longer increases in power. This technique assures that the power lost to the Raman band is minimized.

Figure 2:
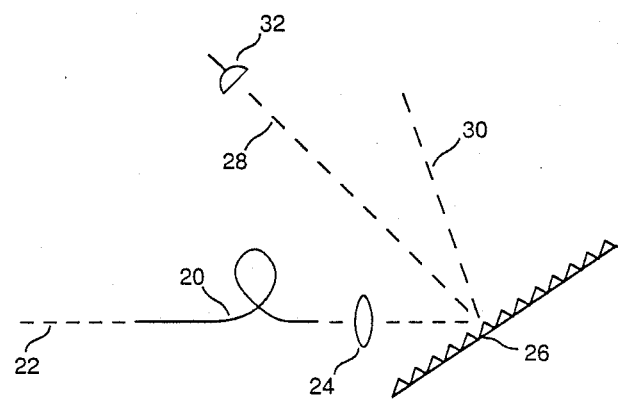
FIG. 2 is a diagram of a test arrangement for determining the length of an optical fiber in accordance with the present invention.

Referring now to FIG. 2, the method for selecting this optical fiber optimum length may be easily comprehended. An optical fiber 20, having a core radius and optimized for the particular wavelength according to the disclosure herein, has an initial length of approximately 30 meters. A beam of laser pulses 22 is transmitted through optical fiber 20, collimated by lens 24 and strikes optical grating 26. Beam 22 is split into two portions 28 and 30, portion 28 being the usable beam portion and portion 30 being Raman band frequencies. The usable beam portion 28 is detected by detector 32. The apparatus of FIG. 2 is set up and the output power of beam 28 is measured. Then a length is cut from optical fiber 20 and the measurement is repeated. These two steps are alternately repeated until the power of beam 28 no longer increases.

While the preferred embodiments of the invention have been illustrated and described, it is to be understood that these are capable of variation and modification, and the invention should not therefore be limited to the precise details set forth, but shall include also such changes and alterations as fall within the purview of the following claims.

What is claimed is:

1. An optical fiber for pulse compression said optical fiber having a core portion and a cladding portion such that the optical fiber has a $\Delta$ of less than 0.3%.

2. A method of selecting an optical fiber for use at a selected wavelength, said optical fiber having a core portion and a cladding portion, including the steps of:
   (a) selecting optical fiber materials for said core portion and said cladding portion such that the optical fiber has a $\Delta$ of less than 0.3%,
   (b) selecting a core radius for said optical fiber materials such that the V for said optical fiber number is in the range of about from 2 to 2.405 at said selected wavelength.

3. A method of selecting an optical fiber for pulse compression, including the steps of:
   (a) selecting optical fiber materials for said core portion and said cladding portion of said optical fiber having a $\Delta$ of less than 0.3%,
   (b) selecting a core size for said optical fiber such that the V number is in the range of about 2 to 2.405 at a wavelength selected for operation of said optical fiber,
   (c) providing a length of said optical fiber of approximately 30 meters,
   (d) conducting an optical pulse through said optical fiber,
   (e) alternately cutting a piece from one end of said optical fiber, removing the Raman band energy from the optical pulse, and measuring the resultant optical pulse energy, until the measured optical pulse energy stops increasing.

4. An optical fiber for pulse compression at a selected wavelength:
   said optical fiber having a core portion and a cladding portion which have a $\Delta$ of less than 0.3,
   said core portion of said optical fiber having a radius such that the V number of said optical fiber is in the range of about from 2 to 2.405 at said selected wavelength.

* * * * *